United States Patent
Fowler et al.

(10) Patent No.: US 7,192,520 B1
(45) Date of Patent: Mar. 20, 2007

(54) MAGNETIC DEVICE FOR ATTACHMENT ON AN EXTERIOR WALL OF A FILTER CANISTER

(75) Inventors: Robert R. Fowler, Surprise, AZ (US); Jack C. Munro, Camarillo, CA (US)

(73) Assignee: Tigermag, Inc., Surprise, AZ (US)

( * ) Notice: Subject to any disclaimer, the term of this patent is extended or adjusted under 35 U.S.C. 154(b) by 517 days.

(21) Appl. No.: 10/866,491

(22) Filed: Jun. 10, 2004

(51) Int. Cl.
*B01D 35/06* (2006.01)

(52) U.S. Cl. .................. 210/223; 210/222; 184/6.25

(58) Field of Classification Search .............. 335/302, 335/303, 304, 306; 210/222, 223, 695; 209/213, 209/223.2, 224; 184/6.25
See application file for complete search history.

(56) References Cited

U.S. PATENT DOCUMENTS

| | | | |
|---|---|---|---|
| 3,402,820 A | 10/1965 | Lohmann | |
| 3,460,679 A | 12/1966 | Llewellyn | |
| 4,218,320 A | 8/1980 | Liaw | |
| 4,826,592 A | 5/1989 | Taylor | |
| 5,186,827 A | 2/1993 | Liberti et al. | |
| 5,216,306 A | 6/1993 | Nakazawa et al. | |
| 5,556,540 A * | 9/1996 | Brunsting | 210/222 |
| 6,554,999 B2 | 4/2003 | Brunsting | |
| 2003/0137375 A1 * | 7/2003 | Brunsting | 335/207 |

FOREIGN PATENT DOCUMENTS

FR 1.777.351 0/1958

* cited by examiner

*Primary Examiner*—David A. Reifsnyder
(74) *Attorney, Agent, or Firm*—Jack C. Munro

(57) ABSTRACT

A magnetic device for attachment on an exterior wall of a canister where the canister is mounted within a liquid flow path. The purpose of the device is to attract ferrous particulate matter flowing within the flow path and cause that ferrous particulate matter to be fixed to the inside surface of the canister therefore no longer flowing in the flow path. The device has a frame which includes a cavity and within that cavity is mounted a baseplate. Mounted on the baseplate are a pair of blocks. Mounted on each of the blocks is a plurality of magnets with the magnets mounted in a side abutting relationship in conjunction with each block. Between the blocks is located a bridge. The bridge permits limited flexing of the frame so the frame can be used to accommodate to different diameters of canisters within about a one-half inch range.

16 Claims, 3 Drawing Sheets

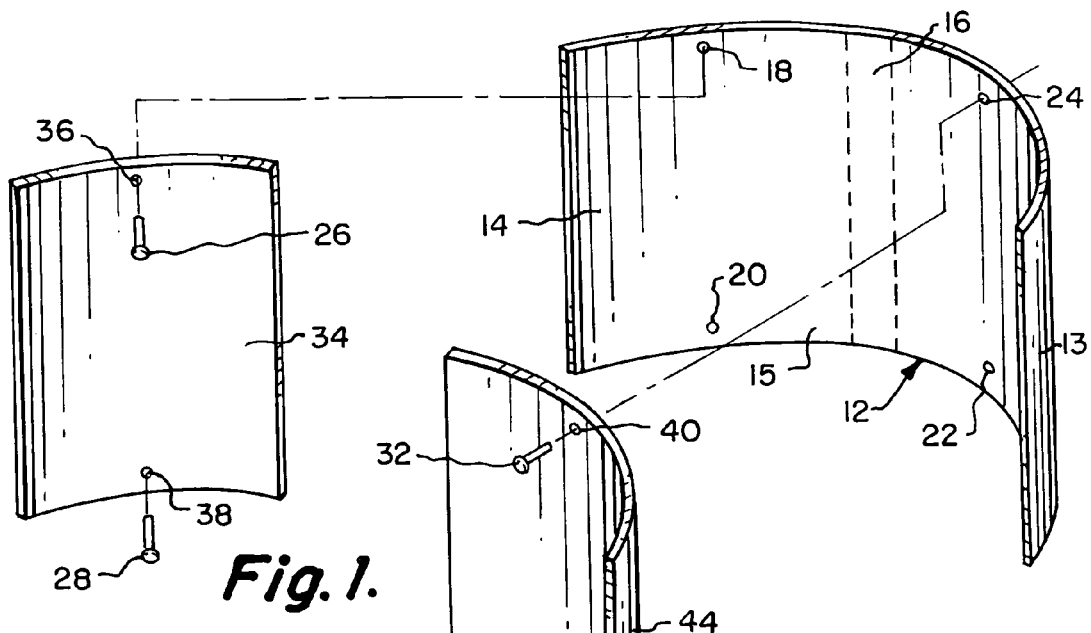
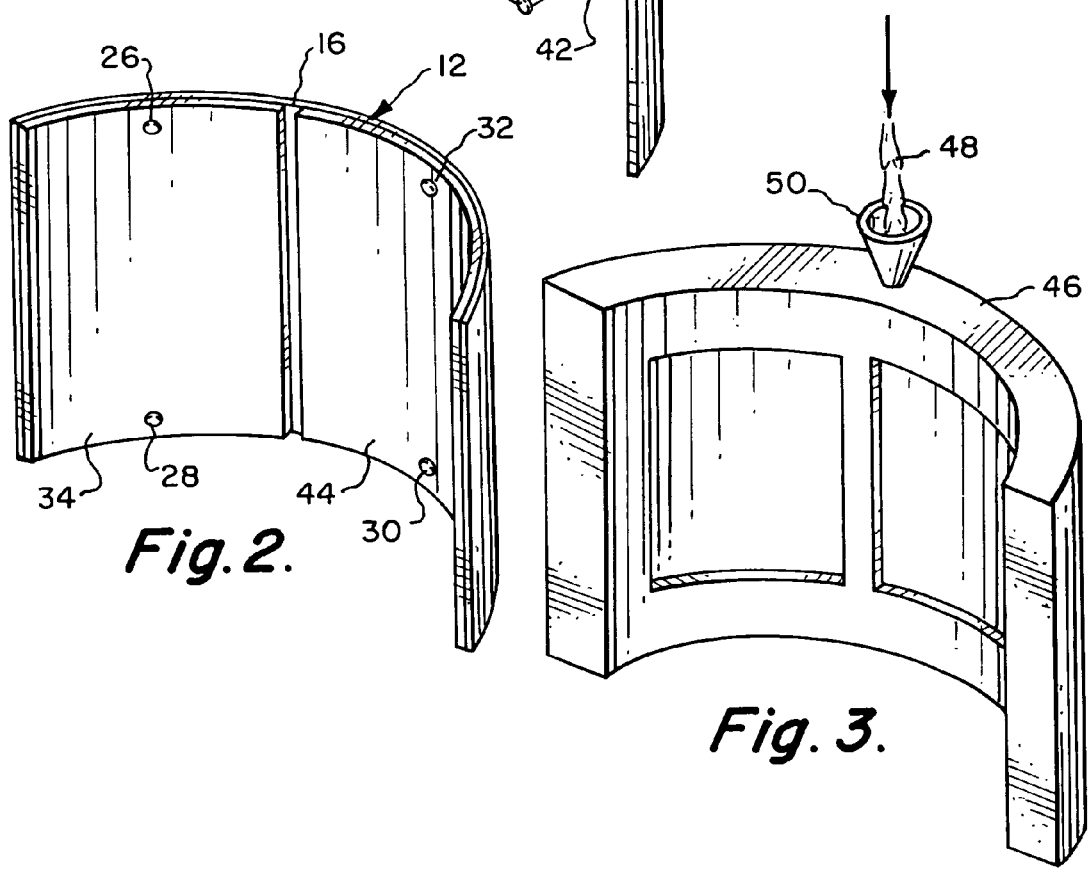

MAGNETIC DEVICE FOR ATTACHMENT ON AN EXTERIOR WALL OF A FILTER CANISTER

BACKGROUND OF THE INVENTION

1. Field of the Invention

The structure of the present invention relates to a device for removing submicron to micron size ferrous particles from moving liquids. The device uses a series of magnets that are mounted within a frame. The device is to be mounted on the exterior surface of a filter canister. A magnetic force attracts ferrous particles entrained within liquid passing through the canister and hold such against the inside surface of the canister preventing continued circulation of these particles within the liquid flow path which includes the canister and thereby prevents these particles from being distributed to be wedged between the working parts of the engine which is to be lubricated by the liquid. The device can also be used to remove ferrous particles from a fuel line flow path and from the flow path of a crankcase.

2. Description of the Related Art

The subject matter of the present invention is deemed to be an improvement over the structure defined within U.S. Pat. Nos. 5,556,540 and 6,554,999. There has been a license agreement by the assignee of the present invention concerning these patents.

Internal combustion engines are used in automobiles, trucks, boats, air compressors, robotics, motorcycles and lawnmowers. All such engines usually include a cylindrical shaped filter canister in conjunction with the lubricating oil flow path of the engine. Also, there may be a second filter canister utilized in conjunction with the fuel flow path of the engine. To eliminate the larger particles of particulate foreign matter that become entrained within the oil due to engine shedding, the engine oil is typically forced through a filter canister which includes a porous filtering medium that is to allow the oil to pass therethrough but allegedly does not allow the passage of the particulate matter. In this manner, the larger particles of particulate matter can be removed from the engine lubricating oil. However, because of this separation technique relies upon filtration through a porous material, particles that are smaller than the openings in the porous material are not removed by the filtering medium. One particularly harmful type of foreign matter in lubricating oil is small metallic (ferrous) particulates which are created by the frictional contact between the moving metal parts of the engine. These particles are actually shards of metal from the metal parts of the engine that are dislodged during the operation of the engine (shedding). These metallic particulates can damage important engine components as such circulate through the engine.

Small metallic particles often have a cross-sectional dimension smaller than the openings in the porous filter material of the filter canister which means that the oil filter is ineffective in the removing of these particles. When not removed by the oil filter, these small metallic particles will freely circulate through the engine until they are finally removed when the oil is changed. Typically, the porous material used in oil filters consists of a fibrous material that has openings greater than twenty microns. Hence, metallic particles with a cross-dimension of twenty microns or smaller are not trapped by the filter. There have been reports that have been prepared in the past that have stated that the vast majority of wear in an engine are caused by metallic particles in the oil that are less than twenty microns. SAE studies have shown that there is a seventy percent wear reduction within an engine when particulates that are fifteen micron and larger are removed. A further huge advance is anticipated when particles down to two micron are removed. This particulate matter is small enough to get wedged between the metallic working members of the engine, and as the engine continues to operate, these metallic particulates causes scoring to occur on the metal working members of the engine. Also, many of these larger metallic particles (twenty microns and above) have sharp edges. Movement of these large particles by the force of the flow of the oil will cause the particles to "slice" like a knife through the filter canister medium producing holes greater than twenty microns thereby decreasing the filtering effectiveness of the filter canister resulting in the filter being ineffective for particulates larger than twenty microns.

The micron and submicron sized metallic particles are the major cause of wear of the moving components of the engine. Specifically, as oil is circulated throughout the engine to lubricate the various moving components, the metallic particles entrained in the oil are carried to be interfaced between the moving components. At these locations, the hardness of the metallic particles causes metal to bear against metal, and reliance is placed solely upon the oil to maintain a lubricating film. When these metallic particles are brought to the interfaces, damage to the adjoining surfaces are likely. This damage eventually results in a degradation of the close tolerances between the moving parts, causing a loss in operating engine efficiency and more frequent maintenance in the form of repair. By some estimates, these metallic particles are the cause of more than one-half of the wear on the engine.

In the past, one approach taken by the prior art to eliminate these particles is to install a magnetized drain plug in the crankcase of the engine. The magnetized drain plug generates a magnetic field around the drain plug which is to attract and remove some of the metallic particles from the lubricating oil that flow through the crankcase. When the engine is running, the flow of oil through the crankcase is at a high flow rate. The magnetized drain plug has a very weak magnetic field and only collects particles when the flow of the oil stops. So whatever particles happen to be in close proximity of the drain plug are then caused to adhere to the drain plug. Once the engine is restarted, those particles that are on that drain plug are merely washed away and then recirculated throughout the entire engine to then be wedged between the working parts.

Other prior approaches to solve this problem is to attach a magnet to the oil filter canister tending to create a magnetic field within the filter to attract and hold the ferrous particles against the inside wall of the filter. Unfortunately, prior art attempts did not generate a sufficiently strong magnetic field to attract and hold any significant number of metallic particles from the oil to the inside wall of the filter canister. The metallic particles contained in the oil, even if such passed through the magnetic field continued to circulate through the engine. However, the magnetic devices of U.S. Pat. Nos. 5,556,540 and 6,554,999 have a sufficiently strong field to be effective generally between one-hundred twenty five pounds and five hundred pounds of force against the canister.

SUMMARY OF THE INVENTION

The basic embodiment of magnetic device for attachment on an exterior wall of a filter canister of the present invention comprises incorporating a resting curvature in the magnetic device. The device includes a non-ferrous frame having an internal cavity. A single ferrous baseplate is mounted within the cavity completely covering the cavity. The ferrous baseplate has an exterior surface and an interior surface with the exterior surface being exposed to ambient. The plate has a peripheral edge and this peripheral edge is embedded within the frame. A pair of ferrous blocks are mounted on the interior surface of the plate. The ferrous blocks are spaced apart forming a bridge between the blocks. The bridge functions as a fulcrum permitting flexing of the frame to assume different curvatures of the frame from the resting curvature permitting the magnetic device to be mounted flush against a size range of canister filters. A plurality of magnets are mounted within the cavity with the magnets being mounted against the blocks. The magnets substantially cover the blocks dividing the magnets into a pair of spaced apart zones separated by the bridge. The magnets have an exposed surface adapted to be placed flush against a filter canister. Whereby the magnets generate a magnetic field which not only secures the magnetic device to the filter canister but generates a magnetic field within the canister which attracts and holds ferrous particulate matter which is flowing through a closed fluid flow path against an interior sidewall of the canister preventing such from exiting from the canister.

A further embodiment of the present invention is where the basic embodiment is modified by having the frame to be enclosing.

A further embodiment of the present invention is where the basic embodiment is modified by the ferrous blocks being fixedly mounted onto the single ferrous baseplate.

A further embodiment of the present invention is where the basic embodiment is modified by the ferrous blocks being of the same size.

A further embodiment of the present invention is where the basic embodiment is modified by the ferrous blocks being defined as being constructed of a solid material.

A further embodiment of the present invention is where the basic embodiment is modified by the ferrous blocks being defined as being constructed of a resilient material impregnated with ferrous particulate matter.

A further embodiment of the present invention is where the just previous embodiment is modified by the resilient material being defined as being a plastic.

A further embodiment of the present invention is where a previous embodiment is modified by the resilient material being defined as being a rubber.

A further embodiment of the present invention is where a previous embodiment is modified by the resilient material being defined as comprising a combination of rubber and plastic.

A further embodiment of the present invention is where the basic embodiment is modified by defining that the resting curvature comprises an arc of a circle.

A further embodiment of the present invention is where the basic embodiment is modified by the resting curvature being defined as comprising one hundred twenty degrees or greater.

A further embodiment of the present invention is where the basic embodiment is modified by having the single ferrous baseplate to be of a thickness of 0.022 to 0.043 inches.

A further embodiment of the present invention is where the basic embodiment is modified by constructing the block of a plastic insulative material which uses a pair of spaced apart inner metallic plates on which the magnets are mounted.

A further embodiment of the present invention is where the just previous embodiment is modified by the plastic insulative blocks being of the same thickness.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 1 is an exploded isometric view of a portion of the first embodiment of magnetic device of the present invention showing how the device is to be constructed;

FIG. 2 is an isometric view of portion of the first embodiment of magnetic device of the present invention showing the portion assembled;

FIG. 3 is an isometric view depicting the forming of the enclosing frame which is to be secured around the portion shown in FIG. 2;

DETAILED DESCRIPTION OF THE INVENTION

Figure 4:
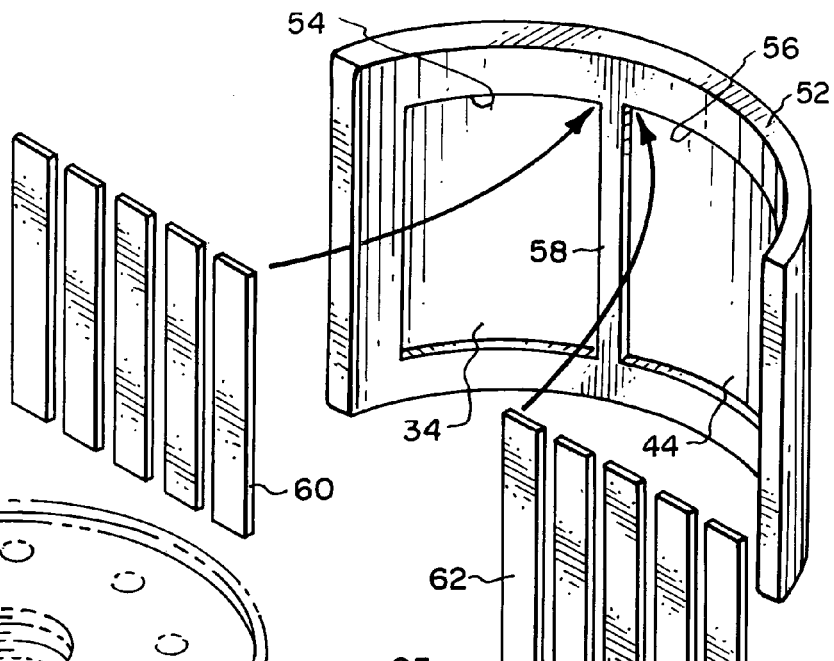
FIG. 4 is an exploded isometric view depicting installation of the magnets in conjunction with the enclosing frame and the portion of the first embodiment of magnetic device of the present invention.

Referring particularly to FIGS. 1–6 of the drawings, there is shown the first embodiment 10 of the present invention. First embodiment 10 utilizes a baseplate 12. The baseplate 12 is to be constructed of a low-carbon steel with a thickness generally in the range of 0.022 to 0.027 inches. The baseplate 12 is to be coated with a galvanic coating for corrosion resistance. The baseplate 12 could also be made of stainless steel. The baseplate 12 has a resting curvature that is an arc of a circle. A typical circle would be the arc of a circle that has a diameter of between two and one-half to seven inches. The baseplate 12, if it was placed flat before it had the resting curvature, would assume a rectangular configuration. The baseplate 12 has a peripheral edge 14. Baseplate 12 has an exterior surface 13 and an interior surface 15.

The baseplate 12 has a transverse center area that is to be defined as the bridge 16. The baseplate 12 has four in number of holes 18, 20, 22 and 24. The holes 18, 20, 22 and 24 are each to respectively connect with a rivet 26, 28, 30 and 32. The rivets 26 and 28 pass through respective holes 36 and 38 that are formed within a block 34. The rivets 36 and 38 wedge tightly with their respective holes 18 and 20 to secure the block 34 to the baseplate 12. The block 34 will have the same resting curvature as the baseplate 12. The rivets 30 and 32 pass respectively through holes 40 and 42 that are formed within a block 44. Rivets 30 and 32 wedge tightly with their respective holes 22 and 24. Block 44 is identical to block 34. Blocks 34 and 44 are mounted on the interior surface 15. The blocks 34 and 44 are to be constructed of steel and having a thickness of 0.096 to 0.101 inches. Each of the blocks 34 and 44 are basically rectangular in shape except, of course, having the curvature. The blocks 34 and 44 are to be made of low-carbon sheet steel. The blocks 34 and 44 are coated with a zinc plating as a corrosion preventor. Typical thickness of the coating is between 0.0001 and 0.0002 inches thick.

The assembly shown in FIG. 2 is then to be placed within a mold 46. Into the mold 46 is to be poured hot liquid plastic 48 through an injection port 50. When the plastic 48 hardens and the mold 46 is opened, there is to be removed from the mold a plastic frame 52 which has on its inner surface a pair of spaced apart openings 54 and 56 which are separated by means of a bridge strip 58.

There is to be placed within the opening 54 five in number of strip magnets 60. There is also to be placed within the opening 56 five in number of strip magnets 62. Each of the strip magnets 60 and 62 are identical. It is to be understood that the number of the strip magnets 60 and 62 employed can vary without departing from the scope of this invention. The strip magnets 60 and 62 have a slight transverse curvature that is equal to the resting curvature of the baseplate 22 which is also assumed in the frame 52. The magnets 60 and 62 are to be made of neodymium and will have a strength of around forty to forty-five Mg.Oe. The longitudinal axis of the strip magnets 60 and 62 are located transversely within the frame 52. Each of the strip magnets 60 and 62 are magnetically held onto the blocks 34 and 44.

The use of the blocks 34 and 44 as well as the baseplate 12 is to direct the magnetic energy in a direction outward from the inside surface of the first embodiment 10. There will be essentially no magnetic energy being emitted from the exterior surface 13 of the baseplate 12. Typically, the magnets will have a longitudinal length of one and three quarters to two inches, a width of approximately five-sixteenths of an inch and a thickness of three thirty seconds of an inch. However, it is considered to be within the scope of this invention that the size of the magnets can readily vary. It is to be noted by noticing FIG. 6 that the peripheral edge 14 of the baseplate 12 is embedded within the frame 52.

Figure 5:
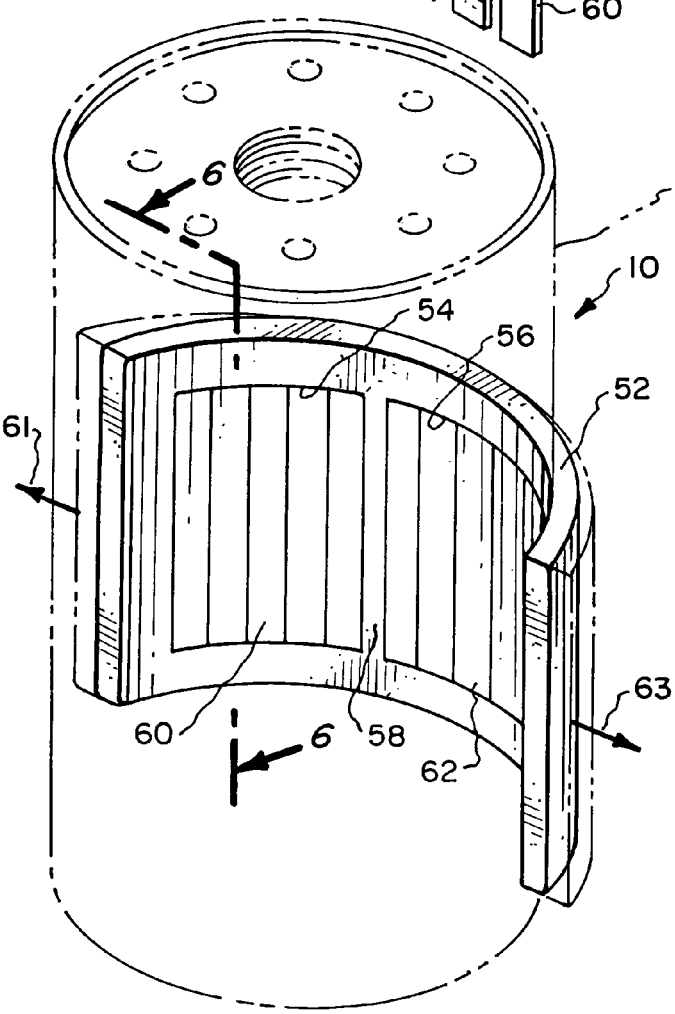
FIG. 5 is an isometric view of the completely assembled first embodiment of magnetic device of the present invention.
Figure 6:
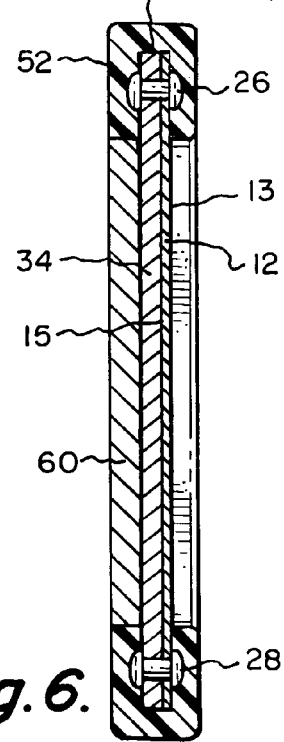
FIG. 6 is a transverse cross-sectional view taken along line 6—6 of FIG. 5.

In referring to FIG. 5, it can be seen that the frame 52 is capable of movement, as indicated by the dotted lines in FIG. 5. This movement is depicted by arrows 61 and 63 so that the frame 52 can be used to accommodate to a range of diameter variations of the filter canister 65. Typically, the adjustment would be so as to have the first embodiment 10 to accommodate to about a one-half inch variance in diameter of the filter canister 65. This adjustment is permitted by a flexing due to the creating of a fulcrum within the bridge 16 of the baseplate 12. The bridge strip 58 extends entirely across the bridge 16. The thickness of the blocks 34 and 44 prevents bending or flexing of the baseplate 12 in the area of the blocks 34 and 44 but flexing will be permitted in the area of bridge 16 due to the thinness of the baseplate 12. There is also a gap located between the blocks 34 and 44 which is located at the bridge 16.

Figure 7:
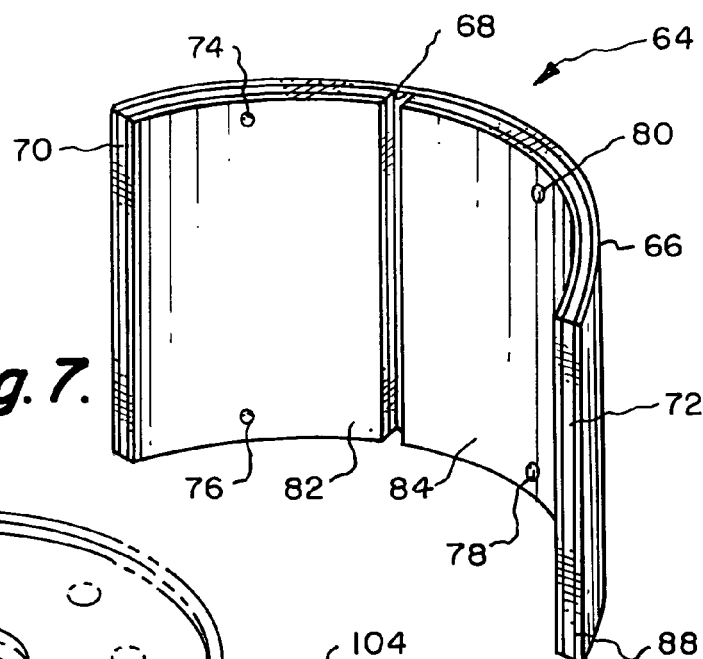
FIG. 7 is an isometric view of a portion of the second embodiment of magnetic device of the present invention not mounted in an enclosing frame.
Figure 8:
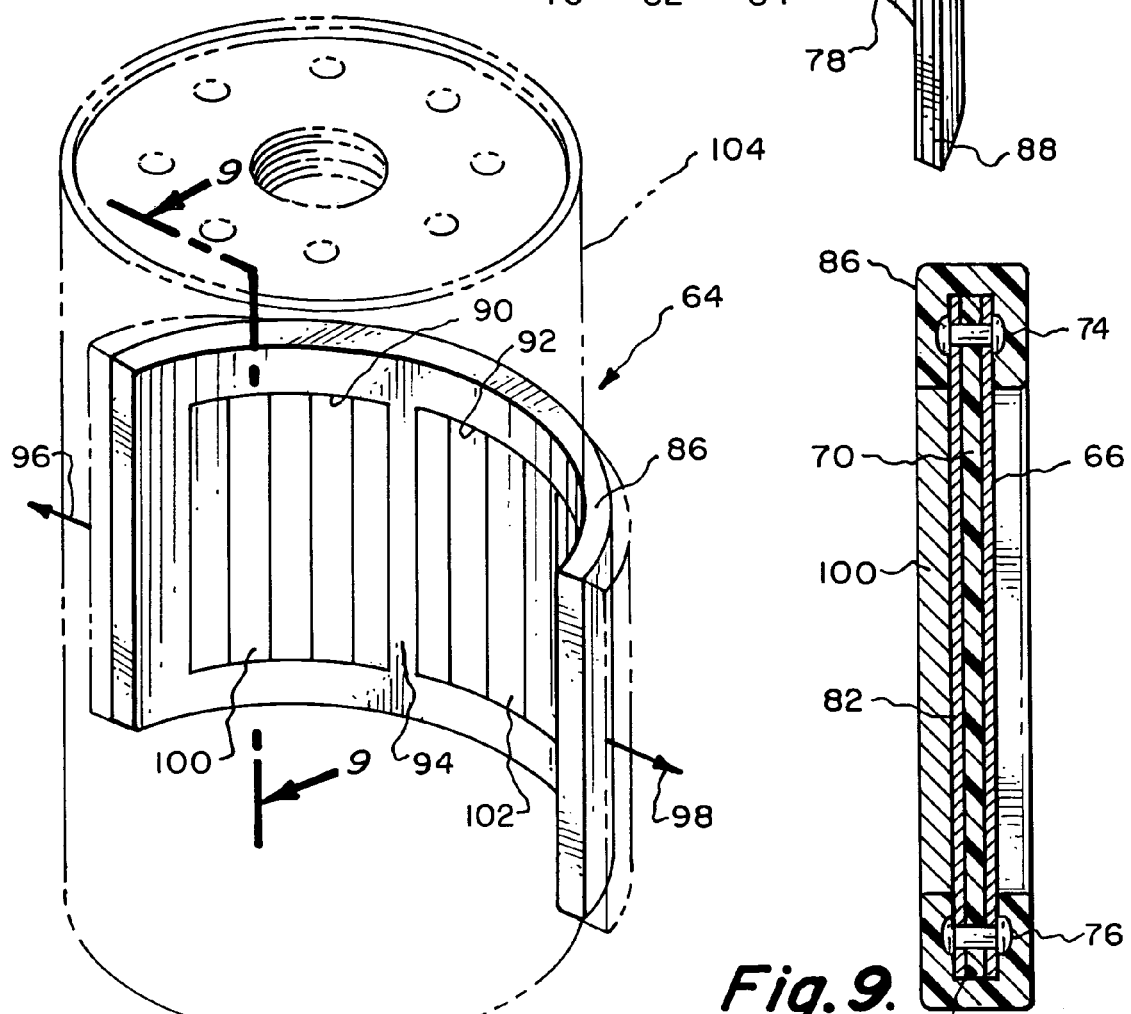
FIG. 8 is an isometric view of the second embodiment of magnetic device of the present invention showing the device completely assembled with the enclosing frame.
Figure 9:
FIG. 9 is a cross-sectional view of the second embodiment of magnetic device of the present invention taken along 9—9 of FIG. 8.

Referring particularly to FIGS. 7–9 of the drawings, there is shown the second embodiment 64 of magnetic device of the present invention. The second embodiment 64 includes a baseplate 66 which is basically identical to baseplate 12. The baseplate 66 has a transverse center section defined as a bridge 68 which is basically identical to the bridge 16. There are a pair of blocks 70 and 72 which are mounted by rivet fasteners 74, 76, 78 and 80 to the baseplate 66. On the exterior surface of the block 70 there is mounted an inner plate 82, and on the exterior surface of the block 72 is mounted an inner plate 84. The inner plates 82 and 84 are constructed to be of the same thickness as the baseplate 66 and also is formed to have an inherent resting curvature which the baseplate 66 also has. Each of the blocks 70 and 72 are to be identical and are to be constructed of either a rubber, a plastic or a combination of rubber and plastic material within which is embedded ferrous particulate matter. The thickness of the blocks 70 and 72 will normally be within the range of 0.040 to 0.065 inches. Typically, the percentage of ferrous material within each of the blocks 70 and 72 will be about ninety percent. The sandwich configuration shown in FIG. 7 is then to be placed within the mold, as previously described, and the frame 86 is then formed around this sandwich configuration. The peripheral edge 88 of the sandwich configuration of FIG. 7 will be embedded within the frame 86, as is clearly shown in FIG. 9.

After extraction of the frame 86 from the mold, there is located a pair of cavities 90 and 92. Cavity 90 is separated from cavity 92 by a bridge strip 94. The bridge strip 94 is located directly adjacent the bridge 68. It is to be understood that the frame 86 which includes the bridge strip 94 will be constructed entirely of a resilient material, such as plastic. Also by observing of FIG. 8, it is to be seen that the second embodiment 64 is adjustable with a fulcrum occurring in the area of the bridge 68, as is clearly represented by movement of the second embodiment 64 to the dotted line configuration shown in FIG. 8. Arrows 96 and 98 depict movement of the second embodiment 64 to the expanded configuration which would be to accommodate a slightly larger diameter in size of cylindrical filter canister 104 on which the second embodiment 64 is to be located.

Within the cavity 90, there is to be located five in number of strip magnets 100, and within the cavity 92, there are to be mounted five in number of strip magnets 102. The strip magnets 100 and 102 are basically identical and are identical to the previously described strip magnets 60 and 62.

Within both the first embodiment 10 and the second embodiment 64 there is created a pair of zones of magnetism by the strip magnets 60, 62, 100 and 102. The zones of magnetism in the first embodiment 10 are separated by the bridge strip 58, and in the second embodiment 64 they are separated by the bridge strip 94. It is these zones of magnetism that emit an exceedingly powerful magnetic force that is extended to within the fluid flow path that is being conducted through the oil filter canister 65 or 104.

The discussion included in this patent is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation. Particularly, it should be understood that as the disclosure relates to elements of the invention, the words for each element may be expressed by equivalent apparatus terms if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A magnetic device adapted for attachment to an exterior wall of a cylindrical filter canister, said magnetic device having a resting curvature, said device comprising:
   a non-ferrous frame having an internal cavity;
   a single ferrous baseplate mounted within said cavity, said ferrous baseplate having an exterior surface and an interior surface, said exterior surface to be located further from the canister when installed thereon, said baseplate having a peripheral edge, said peripheral edge being embedded within said frame;
   a pair of ferrous blocks being mounted on said interior surface, said ferrous blocks being spaced apart forming a bridge between said blocks, said bridge functioning as a fulcrum permitting flexing of said frame to assume different curvatures of said frame from said resting curvature thereby permitting said magnetic device to adjust to different diameters of filter canisters in order to be mounted flush against each of these canisters;
   a plurality of magnets mounted within said cavity with said magnets being mounted directly adjacent said blocks, said magnets substantially covering said blocks dividing said magnets into a pair of spaced apart zones separated by said bridge, said magnets having an exposed surface adapted to be placed flush against the filter canister, whereby said magnets generate a magnetic force which not only secures said magnetic device to a filter canister but generates a magnetic field within the canister which attracts and holds ferrous particulate matter which is flowing through the liquid flow path which includes the filter canister against an interior sidewall of the canister preventing such from exiting the canister.

2. The magnetic device as defined in claim 1 wherein: said single ferrous baseplate completely covers said cavity, said baseplate having a peripheral edge, said peripheral edge being embedded within said frame.

3. The magnetic device as defined in claim 1 wherein: said frame being enclosing.

4. The magnetic device as defined in claim 1 wherein: each of said ferrous blocks being fixedly secured to said single ferrous baseplate.

5. The magnetic device as defined in claim 1 wherein: each of said ferrous blocks being of the same size.

6. The magnetic device as defined in claim 1 wherein: each of said ferrous blocks being constructed of solid metallic material.

7. The magnetic device as defined in claim 1 wherein: each of said ferrous blocks being constructed of a resilient material within which is impregnated ferrous particulate matter.

8. The magnetic device as defined in claim 7 wherein: said resilient material including plastic.

9. The magnetic device as defined in claim 7 wherein: said resilient material including rubber.

10. The magnetic device as defined in claim 7 wherein: said resilient material including a combination of rubber and plastic.

11. The magnetic device as defined in claim 1 wherein: said resting curvature being the arc of a circle.

12. The magnetic device as defined in claim 1 wherein: said resting curvature being at least one hundred twenty degrees.

13. The magnetic device as defined in claim 1 wherein: said ferrous baseplate being between 0.022 inches to 0.027 inches in thickness.

14. The magnetic device as defined in claim 1 wherein: said blocks being constructed of a resilient material impregnated with ferrous particle matter, a pair of spaced apart inner plates being mounted on said resilient material, said magnets being mounted on said inner plates.

15. The magnetic device as defined in claim 14 wherein: each of said blocks being of the same thickness.

16. The magnetic device as defined in claim 1 wherein: said magnets being mounted directly on said blocks.

* * * * *